United States Patent [19]
Ott

[11] B 3,925,549

[45] *Dec. 9, 1975

[54] 1-SUBSTITUTED-QUINAZOLINE-2(1H)-THIONES IN THE TREATMENT OF INFLAMMATION

[75] Inventor: Hans Ott, Basel-Land, Switzerland

[73] Assignee: Sandoz, Inc., E. Hanover, N.J.

[ * ] Notice: The portion of the term of this patent subsequent to Sept. 12, 1992, has been disclaimed.

[22] Filed: June 11, 1973

[21] Appl. No.: 368,862

[44] Published under the Trial Voluntary Protest Program on January 28, 1975 as document no. B 368,862.

Related U.S. Application Data

[60] Division of Ser. No. 78,587, Oct. 6, 1970, Pat. No. 3,764,600, which is a continuation of Ser. No. 819,477, April 25, 1969, which is a continuation-in-part of Ser. No. 741,805, July 1, 1968.

[52] U.S. Cl. ............................... 424/251; 195/51
[51] Int. Cl.² ................................. A61K 31/505

[58] Field of Search ..................... 424/251

[56] References Cited
UNITED STATES PATENTS
3,453,179  7/1969  Greenspan et al. ............... 195/51

FOREIGN PATENTS OR APPLICATIONS
1,520,743  3/1968  France

*Primary Examiner*—Stanley J. Friedman
*Attorney, Agent, or Firm*—Gerald D. Sharkin; Richard E. Vila

[57] ABSTRACT

The present invention discloses compounds of the class of 1-substituted-quinazoline-2(1H)-thiones from the group of 1-substituted-4-aryl-quinazoline-2(1H)-thiones and 1-substituted-4-aryl-3,4-dihydraquinazoline-2(1H)-thiones, e.g. 1-isopropyl-4-phenylquinazoline-2-(1H)-thione, which are useful as anti-inflammatory agents; methods of preparation of said compounds; and pharmaceutical compositions incorporating said compounds.

19 Claims, No Drawings

1-SUBSTITUTED-QUINAZOLINE-2(1H)-THIONES IN THE TREATMENT OF INFLAMMATION

This application is a divisional of application Ser. No. 78,587, filed Oct. 6, 1970, now U.S. Pat. No. 3,764,600, which application is a continuation of now abandoned application Ser. No. 819,477, filed Apr. 25, 1969, which is a continuation-in-part of abandoned application Ser. No. 741,805, filed July 1, 1968.

The present invention relates to bicyclic compounds. More particularly, the invention provides 1-substituted-quinazoline-2(1H)-thiones from the group of 1-substituted-4-aryl-quinazoline-2(1H)-thiones an 1-substituted-4-aryl-3,4-dihydro-quinazoline-2(1H)-thiones, methods for preparation of said quinazoline-2-(1H)-thiones, and pharmaceutical compositions incorporating said compounds.

The chemical compound which is 4-phenyl-quinazoline-2(1H)-thione has not to my knowledge been produced by prior art workers. An attempt to prepare said compound by reaction of 4-phenyl-2(1H)-quinazolinone with phosphorus pentasulfide was reported as unsuccessful by Albert and Barlin, J. Chem. Soc. 1962, 3129. The compound which is 3,4-dihydro-4-phenyl-quinazoline-2(1H)-thione and its preparation have been long known, as described, for example, by Gabriel et al., Ber. Deutsch. Chem. Ges. 30, 1130 (1897); 32, 1295 (1899); and 32, (1899). To my knowledge no pharmacological activity has been associated with said 3,4-dihydro-4-phenyl-quinazoline-2(1H)-thione.

In accordance with the present invention, it has been found that new 1-substituted-quinazoline-2(1H)-thiones having pharmacological activity are represented by the following structural formula I:

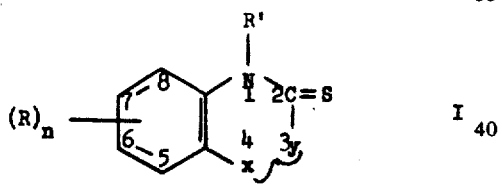

wherein
$\widehat{x\ y}$ is either

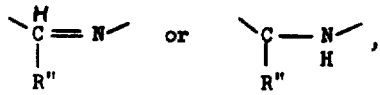

R is, independently, hydrogen, halo, preferably having an atomic weight no greater than 80, i.e., fluoro, bromo and chloro; lower alkyl; preferably containing 1 to 5 carbon atoms; lower alkoxy; nitro; cyano; lower alkylthio; trifluoromethyl; or di(-lower)alkylamino in which each alkyl contains 1 to 4 carbon atoms;

n is 1 or 2, and when 2 then one and the other R is, independently, halo, lower alkyl or lower alkoxy, or the other R is di(lower)alkylamino;

R' is lower alkyl, preferably containing 1 to 5 carbon atoms, e.g., methyl, ethyl, propyl, isopropyl; butyl, sec-butyl and isobutyl; allyl; methallyl; or propargyl;

R'' is phenyl; or substituted phenyl of the formula:

Y represents halo; lower alkyl, preferably containing from 1 to 4 carbon atoms, e.g., methyl, ethyl, propyl and butyl; lower alkoxy, preferably containing from 1 to 4 carbon atoms, e.g., methoxy, ethoxy, propoxy and butoxy; or trifluoromethyl; and Y' represents hydrogen; halo; lower alkyl, preferably containing from 1 to 4 carbon atoms, e.g., methyl, ethyl, propyl and butyl, or lower alkoxy preferably containing from 1 to 4 carbon atoms, e.g., methoxy, ethoxy, propoxy and butoxy.

The compounds of formula I in which $\widehat{x\ y}$ is

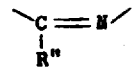

are surprisingly preferably produced by a Step A reaction involving reacting the corresponding 1-substituted-2(1H)-quinazolinone of the formula II:

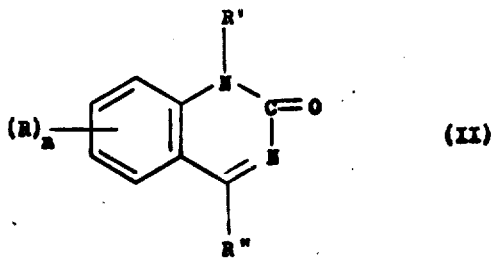

wherein R, R', R'' and n have the above-defined meaning, with phosphorus pentasulfide at elevated temperatures to obtain compounds of the invention having the formula IA, as follows:

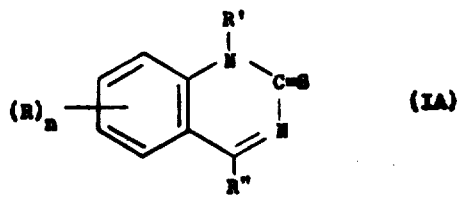

wherein R, R', R'' and n have the above-defined meaning.

The compounds of formula I in which $\widehat{x\ y}$ is

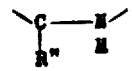

are preferably produced by a Step B reaction of a compound III which is a 2-aminobenzohydrol of the formula:

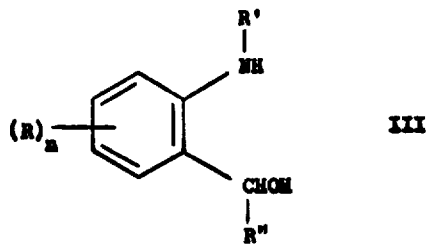

wherein R, R', R'' and n have the above-defined meaning, with a compound IV which is isothiocyanic acid having the formula IV, as follows:

HN=C=S

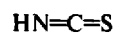

to obtain compounds of the invention having the formula IB, as follows:

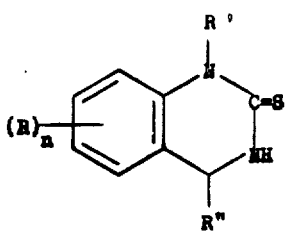

wherein R, R', R" and n have the above-defined meaning.

The production of compounds IA of the invention by the reaction of Step A is preferably carried out by reacting a compound of formula II with phosphorus pentasulfide in an organic solvent at elevated temperature between at least about 70° C. ranging up to about 180° C., more preferably between 100° to 130° C., and conveniently at reflux temperatures, followed by recovery in a conventional manner. Conventional organic solvents may be employed including, by way of illustration, pyridine, toluene and xylene. The especially preferred solvent is pyridine which appears to have a beneficial effect on the rate of reaction. Reaction time may vary fairly widely between 1 to 50 hours, and is more typically between 10 to 30 hours.

The production of compounds IB of the invention by Step B involves reaction of the type hereinbefore referred to as known from Gabriel et al., and is preferably carried out in an acid aqueous medium at elevated temperatures in the range of 50° to 150° C., more preferably 70° to 110°C. The isothiocyanic acid reacted with compound III to obtain compound IB is well known to be unstable and is therefore desirably employed in te form of salt of the formula IVA, as follows:

$$MN=C=S$$

IVA wherein M is a cation forming a water-soluble isothiocyanate which in an acidic aqueous medium yield the desired isothiocyanic acid, said cation M preferably being a cation of an alkali metal, e.g., sodium; alkaline earth metal, e.g., calcium; or the cation of ammonia, i.e., the ammonium salt. The preferred compound IVA is ammonium isothiocyanate. The acid employed to produce in situ the desired isothiocyanic acid from compound IVA is preferably a strong inorganic acid, for example, sulfuric acid, nitric acid, hydrochloric acid and the like, more preferably hydrochloric acid. If desired or required, an organic co-solvent may be employed to insure optimum solubility of compound III in the aqueous reaction medium. Suitable co-solvents for this purpose are well known and include, by way of illustration, methanol, ethanol and dioxane. The reaction of Step B typically involves a period of time of from 10 minutes to 5 hours, more usually 15 to 60 minues. The product compound IB is typically recovered by conventional procedures.

Another preferred procedure for preparation of the compounds of formula IA involves cyclizing a 2-aminobenzophenone of formula V:

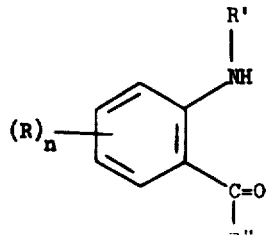

wherein R, R', R" and n are as defined, by subjecting said compound V to the action of an acid halide and isothiocyanate of the formula IVB:

$$M'-N=C=S$$

IVB wherein M' is a cation, or to the action of the reaction product of said acid halide and isothiocyanate.

The preparation of compounds IA from a compound V is conveniently carried out in an inert solvent medium at temperatures in the range of 10° to 80° C., preferably 30° to 70° C. The reaction may be understood as including the reaction of compound V with the reaction product of an acid halide and isothiocyanate of formula IVB. For this reason, it is generally preferred to first react the acid halide and compound IVB and then add the starting compound V to the resulting reaction mixture. The reaction of the acid halide and compound IVB is exothermic and preferably initiated at lower temperatures in the range of 10° to 30° C. As acid halides one employs any of several acid halides which do not carry substituents or functional groups interfering with the cyclization. The more suitable materials are represented, for example, by acetyl chloride and benzoyl chloride, preferably benzoyl chloride. The preferred compounds IVB are those most readily reacting with the acid halide to eliminate as by-product a halide of the cation M' of the compound IV. The preferred cations M' may be represented, for example, by a cation of an alkali metal, e.g., sodium, and by the cation of ammonia, e.g., the ammonium salt. The more preferred compound IVB is ammonium isothiocyanate. Organic solvents suitable for the reaction are of conventional type which provide an inert medium. Such solvents by way of example the lower alcohols, ketones and cyclic ethers, preferably acetone. It has been demonstrated that the reaction compounds V with the acid halide and isothiocyanate, or reaction product thereof, results directly in a high yield of compounds IA. In situations where the starting compounds V bear certain substituents such as represented by R in formula V being lower alkyl, e.g., 4-methyl-2-isopropylamino-benzophenone, it has been found that the reaction results in a mixture of products including the desired compound IA and a non-cyclized by-product which may even represent the major product of the reaction. In such situations it has been found that such reaction mixtures may be treated with a strong base at elevated temperatures to cyclize the previously non-cyclized by-product to the desired compound IA in high yield. Such treatment of the reaction mixtures containing the non-cyclized by-product is suitably effected in the range of 60° to 100° C. in the presence of an alkali metal hydroxide such as sodium hydroxide or potassium hydroxide in an aqueous solvent medium comprising water and an inert organic solvent of known type such as a cyclic ether, e.g., dioxane. The preparation of the thiones of formula IA by cyclization of a benzophenone is suitably applied to the preparation of compounds IA in which Y and/or Y' is other than an orthosubstituent. In general, the reaction products of formula IA may be recovered by working up by established procedures.

The compounds of formula IA may also be alternatively prepared by cyclizing a compound V with isothiocyanic acid (compound IV) at elevated temperatures.

The production of compounds IA by cyclizing a compound V with isothiocyanic acid is carried out at elevated temperatures in the range of 50° to 150°C., more preferably 100° to 140° C. Because isothiocyanic acid is unstable it is desirably provided in the form of a salt of the formula IVA, as follows:

$$MN=C=S \qquad \text{IVA}$$

wherein M is as previously defined and represents a cation readily eliminated in an acidic medium to permit formation of the desired isothiocyanic acid, said cation M preferably being a cation of an alkali metal, e.g., sodium or potassium; or the cation of ammonia, i.e., the ammonium slat. The preferred compound IVA is ammonium isothiocyanate. The acid employed to produce in situ the desired isothiocyanic acid from compound IVA is preferably a lower carboxylic acid, desirably glacial acetic acid, which may also be conveniently employed as solvent for the reaction. The reaction product of formula IA may be isolated from the reaction mixture by conventional procedures.

The 1-substituted quinazolinones of formula II employed as starting material in Step A, above, may be produced as now described below. In the preferred method for preparing the compounds of structural formula II, an appropriately substituted o-aminobenzophenone is reacted with ethyl carbamate in the presence of a suitable Lewis acid, e.g., zinc chloride. Another preferred method involves cyclizing an appropriately substituted o-aminobenzophenonimine, preferably by reaction with phosgene. Alternatively, the compounds of formula II may be prepared by reacting an alkali metal salt of an appropriately substituted quinazolinone with an appropriate halide (R'X). These processes are ememplified below:

wherein R, R' and R'' are as defined above, M' represents an alkali metal, preferably sodium or potassium, and X represents halogen, preferably iodo.

Step 1 of the above-illustrated processes is conveniently carried out at elevated temperatures and in the presence of a catalytic amount of zinc chloride. Preferably, the reaction is effected at a temperature of from about 160° to about 200° C. If desired, the reaction may be carried out in the presence of a suitable inert organic solvent. However, the use of a solvent is not necessary since an excess of the carbamate can be used for this purpose. Depending upon the particular conditions employed the reaction time will generally vary from about 30 minutes to about 2 hours.

The conversion of the 1-metallo quinazolinone (VI) to the desired quinazolinone (I), as illustrated by Step 2, is conveniently carried out at room temperature (20° C.) or at elevated temperatures of up to about 100° C. Desirably, the reaction of the salt with the appropriate halide, preferably in iodide, is carried out in the same solvent employed to prepare the 1-metallo derivative (VI). The preparation of the latter is readily carried out by treating the corresponding 1-unsubstituted quinazolinone in conventional manner, with any of the conventional agents commonly employed for preparing alkali metal salts, e.g., sodium hydride and the alkali metal alkoxides such as sodium methoxide, sodium ethoxide, potassium methoxide and potassium ethoxide. The formation of the salt, preferably the sodium or potassium salt, is conveniently carried out in a suitable inert organic solvent, e.g., dimethylacetamide, diethylacetamide, dimethylformamide, dimethylsulfoxide and dioxane, and at room temperature.

The production of compounds of formula II by step 3 involving the reaction of an o-benzophenonimine of formula VII with phosgene may be carried out at tem-

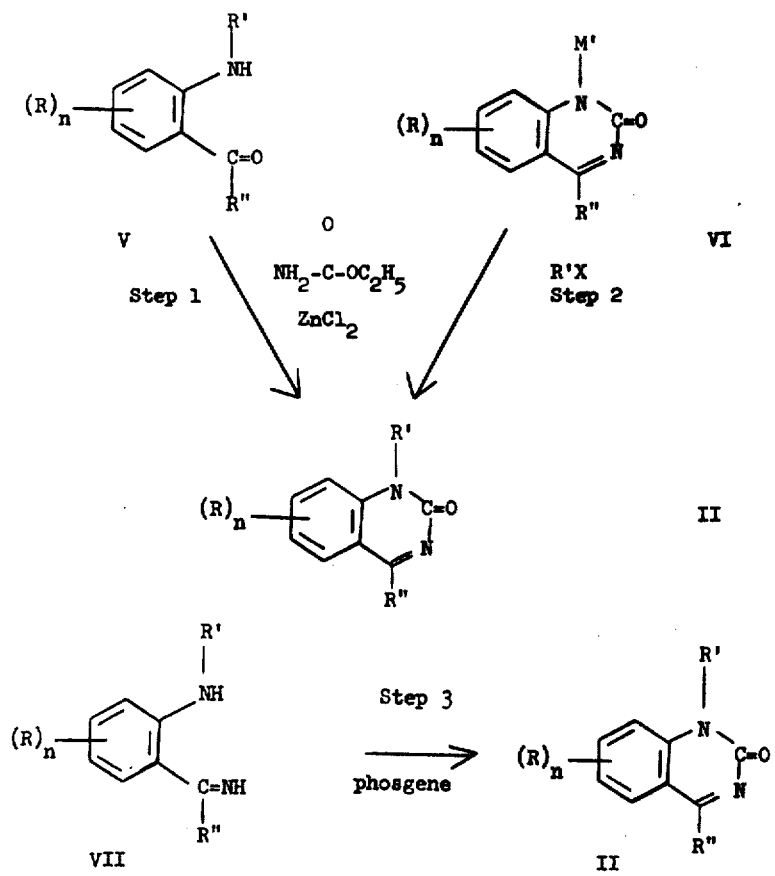

peratures in the range of 0° to 50° C., preferably 10° to 30° C. The reaction of Step 1 is desirably carried out in an inert organic solvent which may be any of the several convenient for the purpose, preferably an aromatic hydrocarbon, e.g., benzene, toluene, and xylene, more preferably benzene. The mole ratio of phosgene to compound VII is not particularly important and a substantial excess of phosgene is employed in te preferred forms of practice to obtain more efficient reaction rates. The compounds of formula II may be obtained from the reaction mixture of Step 3 by working up in a conventional manner. The reaction of Step 3 is well-suited for preparation of the compounds of formula II in which R' represents an alkyl substituent having a tertiary carbon atom attached to the ring nitrogen, e.g., R' being t-butyl.

In each of the Steps 1, 2 and 3 discussed above, the product obtained can be readily recovered employing conventional techniques.

The compound II may also be employed to produce other compounds II, especially in situations in which R is nitro or amino in the starting compound II, and the ultimate product is one in which R is halo, amino or cyano. It is thus possible to produce compounds II in which R is amino from corresponding compounds II in which R is nitro employing a suitable elemental metal reducing agent such as iron, and an acidic reaction medium. The compounds II in which R is amino may be also converted by the well-known Sandmeyer reaction to compounds II in which R is cyano, or halo, particularly bromo.

The preparation of compounds of formula II in which R is dialkylamino may be carried out by the above-indicated reactions, for example, by Step 1 or Step 3, or by reacting a compound II in which R is nitro or amino according to the procedures illustrated as follows:

wherein R', R'' and X are as defined above, R° is dialkylamino, $R_1$ is hydrogen, halo, lower alkoxy or lower alkyl, and $R_2$ is alkyl of 1 to 4 carbon atoms.

The preparation of compounds IIa by a Step 4 involving reaction of a compound VIII with an alkyl halide is an alkylation reaction of known type conveniently carried out in an organic solvent at temperatures in the range of from 20° to 150° C., usually 50° to 100° C. The reaction is desirably carried out in the presence of a base of which the inorganic bases, particularly an alkali metal carbonate, e.g., sodium carbonate, are preferred. In most situations the alkyl halide may be conveniently employed in excess as solvent for the reaction. Other well known organic solvents may be also employed. Representative of the more suitable conventional solvents are dioxane, benzene and toluene. The longer reaction times and higher temperatures are conditions favoring the production of the dialkylamino derivatives. The product compound IIa may be isolated from the reaction mixture of Step 4 by working up in a known manner.

Preparation of compounds IIa by Step 5 involving reaction of a compound IX with hydrogen and a lower aldehyde in the presence of a reducing metal catalyst is a reductive alkylation of known type. The reaction may be conveniently carried out in an organic solvent at elevated pressures and at temperatures in the range of 10° to 80° C., typically at about room temperature. Pressures of from 1 to 5 atmospheres above normal atmospheric pressure are suitably employed. The solvent preferably employed is methanol or the alkanol corresponding in carbon atoms to the aldehyde. However, other solvents of conventional type may be used, for example, dioxane and ethyl acetate. The reducing metal catalyst desirably employed is Raney Nickel although other reducing metal catalysts such as platinum

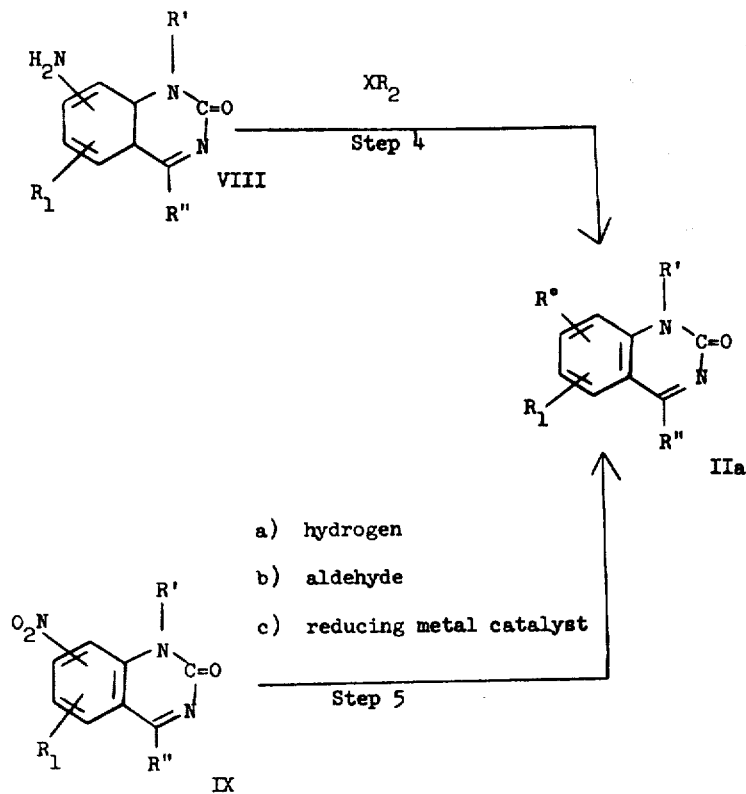

may be used to advantage in certain situations. Step 5 is especially applicable to production of compounds of formula IIa in which R° is dimethylamino. The product compound IIa may be isolated from the reaction of Step 5 by working up in a conventional manner.

In the usual case, the above-described Steps 4 and 5 are preferred for preparation of compounds IIa in which the alklamino substituent is placed at the 6-position of the quinazolinone product. Steps 1 and 3 are most suitable for preparation of compounds II having a dialkylamino substituent at other than the 6-position.

For the preparation of compounds of formula II wherein R and R" are as defined and R' represents a branched alkyl substituent and the branching occurs on the carbon atom directly attached to the ring nitrogen atom, e.g., isopropyl and sec-butyl, it is preferred to employ the processes of Steps 1 and 3 because of better yields of the desired product.

Various of the quinazolinones used as starting materials for the preparation of the 1-metallo derivatives (VI) are known and can be prepared as described in the literature, for example, by reaction of the appropriately substituted-2-aminobenzophenone with urea at temperatures preferably between 160° and 200° C., followed by crystallization from a suitable solvent, e.g., ethanol, as disclosed in Jap. Pat. No. 20865/65 published 9/16/63. Such others which are not specifically disclosed may be prepared from available materials in analogous manner. Such quinazolinones can be also prepared from the appropriately substituted 2-aminobenzophenones by the reaction of Step 1.

The o-aminobenzophenones and o-aminobenzophenonimines which are compounds V and VII, respectively, are likewise either known or can be prepared from available materials by procedures known in the art. In situations where R is 5-nitro or 5-trifluoromethyl in compounds, V, it is preferred to prepare such compounds by reaction of a corresponding 5-R (nitro or trifluoromethyl)-2-chloro-benzophenone with an appropriate amine (R'NH$_2$) in the presence of a suitable catalyst, such as a mixture of copper and cuprous chloride.

The 2-substituted aminobenzohydrols which are compounds III employed as starting material in Step B are either known or can be prepared from available materials by established procedures. One preferred method for preparation of compounds III involves reaction of a 2-aminobenzophenone (compound V) with sodium borohydride in a suitable inert organic solvent, as illustrated hereinafter in Example 5, and described in the literature by G. N. Walker, J. Org. Chem. 27, 1929 (1962).

An alternate preferred process for preparation of 3,4-dihydro-quinazolin-2(1H)-thiones of formula IB involves reacting in a Step C a N-alkyl-N-arylthiourea of the formula X:

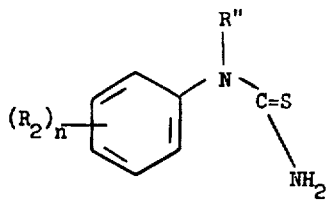

wherein $n$ is as defined, $R_2$ is hydrogen, halo of atomic weight not exceeding 36, lower alkyl or lower alkoxy and R" is the same as R' excluding unsaturated hydrocarbons, provided that only one $R_2$ is halo when $n$ is 2, and that $R_2$ is a straight chain substituent when $R_2$ is an organic substituent in the 2- or 5-position of compound X, and further provided that $R_2$ is no more than one branched substituent; with a benzaldehyde of formula XI:

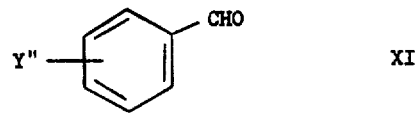

wherein Y" is hydrogen, halo of atomin weight not exceeding 36, lower alkyl of 1 to 3 carbon atoms or lower alkoxy of 1 to 2 carbon atoms, at elevated temperatures whereby compounds of the formula IA are obtained.

The preparation of compounds of formula IB by Step C involving reaction of a compound X with a compound XI is carried out at elevated temperatures in the range of 30° to 120° C., preferably 50° to 100° C. The reaction is carried out in the presence of an acid as catalyst and under anhydrous conditions adapted to effect condensation of compound X and XI. The acid employed is desirably a strong acid which is also a dehydrating acid and which is also otherwise not excessively reactive with compounds X and XI, i.e., substantially non-reactive with compounds X and XI. An acid suitably employed is anhydrous hydrochloric acid (hydrogen chloride in an aromatic solvent) although one may employ other stong acids which are dehydrating agents including organic acids such as an arylsulfonic acid or an alkylsulfonic acid such as benzensulfonic acid, p-toluenesulfonic acid and methanesulfonic acid, preferably p-toluenesulfonic acid. The amount of acid catalyst preferably employed may vary depending upon the particular acid used and, in the case of hydrochloric acid, may be suitably a substantial excess. The reaction is conveniently carried out in an organic solvent which may be any of several conventional organic solvents providing an inert reaction medium, preferably an aromatic solvent such as benzene and the like. Depending upon known factors such as reaction temperature, etc. the reaction may take typically between 1 to 50 hours. The reaction product of formula IB may be isolated from the reaction mixture of Step C by working up by established procedures.

The compounds of formula X may be suitably prepared by subjecting in a Step 6 a compound of the formula XII:

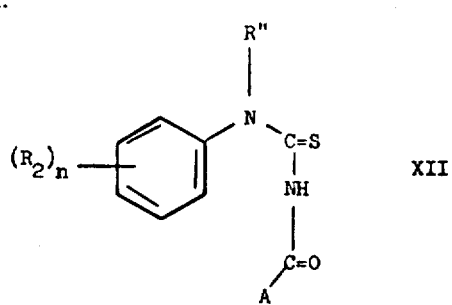

wherein R", $R_2$ and $n$ are as defined and A is the residue of an acid halide, to alkaline hydrolysis at elevated temperatures.

The reaction of Step 6 may be carried out at temperatures in the range of 50° to 140° C., preferably 80° to 120° C. The hydrolysis of Step 6 is suitably effected employing an alkali metal hydroxide, preferably sodium or potassium hydroxide. The reaction is carried out in a suitable liquid solvent medium perferably comprising water and a water miscible inert organic solvent of conventional type such as an ether including the cyclic ethers, preferably dioxane. The reaction product of formula X may be isolated from the reaction re of Step 6 by working up according to established procedures.

The compounds of formula XII may be prepared by subjection in a Step 7 a compound of the formula XIII:

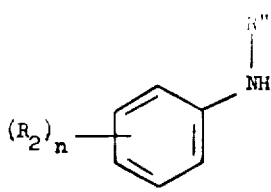

wherein R'', $R_2$ and $n$ are defined, to reaction with an isothiocyanate of formula IVB:

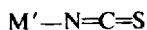

wherein M' is as defined, and an acid halide of the formula XIV:

wherein A is as previously indicated and X' is halogen, preferably chloro, or to the action of te reaction product of said acid halide and isothiocyanate.

The preparation of compounds XII from a compound XIII is conveniently carried out in an inert solvent medium at temperatures in the range of 10° to 80° C., preferably 30° to 70° C. The reaction may be understood as including the reaction of compound XIII with the reaction product of the acid halide of formula XIV and isothiocyanate of formula IVB. For this reason, it is generally preferred to first react the acid halide of formula XIV and compound IVB and then add the starting compound XIII to the resulting reaction mixture. The reaction of the acid halide and isothiocyanate is preferably initiated at lower temperatures in the range of 10° to 40° C. As acid halides one employs any of the conventional acid halides which do not carry substituents or functional groups leading to undesired reactions. The more suitable materials are represented, for example, by acetyl chloride and benzoyl chloride, preferably benzoyl chloride. The preferred compounds IVB are those most readily reacting with the acid halide to eliminate as by-product a halide of the cation M'. The preferred cations M' may be represented, for example, by a cation of an alkali metal, e.g., sodium, and by the cation of ammonia, e.g., the ammonium salt. The most preferred compounds IVB is ammonium isothiocyanate. Organic solvents suitable for the reaction are of conventional type which provide an inert medium. Such solvents include by way of example the lower alcohols, ketones and cyclic ethers, preferably acetone. The reaction product of formula XII may be recovered from the reaction of Step 7 by working up by conventional procedures. It will also be noted that Steps 6 and 7 may be combined to that extent that complete isolation and/or recovery of the product of Step 7 is not necessary, and that in certain cases the reaction mixtures from the reaction of Step 7 may contain varying amounts of the compound of formula X.

The compounds of sttructural formula I (IA and IB) are useful because they possess pharmacological activity in animals. In particular, the compounds are useful as anti-inflammatory agents as indicated by the Carrageenan-induced edema test on rats. For such usage, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon known factors such as the compounds used and the mode of administration. However, in general, satisfactory results are obtained when administered at a daily dosage of from about 0.3 milligram to about 100 milligrams per kilogram of body weight, commonly about 20 mg/kg, preferably given in divided doses 2 to 4 times a day, or in sustained release form. For most mammals the administration of from about 20 milligrams to about 1000 milligrams of the compound per day provides satisfactory results and dosage forms suitable for internal administration comprise from about 3 milligrams to about 500 milligrams of the compound in admixture with a solid or liquid pharmaceutical carrier or diluent.

A representative formulation is a tablet prepared by conventional tabletting techniques and containing the following ingredients.

| Ingredient | Parts by Weight |
|---|---|
| 1-isopropyl-4-phenyl-quinazoline-2(1H)-thione | 50 |
| tragacanth | 2 |
| lactose | 39.5 |
| corn starch | 5 |
| talcum | 3 |
| magnesium stearate | 0.5 |

The usually preferred Compounds I of the invention are those in which R' is ethyl or isopropyl. Remarkably high activity is demonstrated by the 1-isopropyl-7-methyl-4-phenyl-quinazoline-2(1H)-thione.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

1-Isopropyl-4-phenylquinazoline-2(1H)-thione

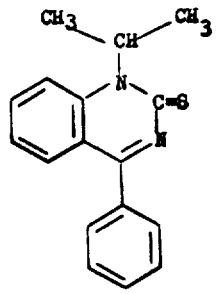

Step A: Preparation of 1-isopropyl-4-phenyl-2(1H)-quinazolinone

A mixture of 21 g. of crude o-isopropylaminobenzophenone, 40 g. of urethane and 1.5 g. of zinc chloride is heated for 4 hours at 180°–200° C. (oil bath). The resulting mixture is cooled to room temperature and then there is added thereto 200 ml. of methylene chloride. The resulting mixture is filtered and the filtrate extracted twice with 100 ml. (each) of water. The organic phase is dried over anhyrous sodium sulfate and evaporated in vacuo. The residue is crystallized from ethyl acetate to obtain 1-isopropyl-4-phenyl-2(1H)-quinazolinone, m.p. 140° C.

Step B: Preparation of 1-isopropyl-4-phenylquinazoline-2(1H)-thione

A mixture of 9.0 g. of 1-isopropyl-4-phenyl-2(1H)-quinazolinone, 30 g. of phosphorus pentasulfide and 100 ml. of pyridine is refluxed for 20 hours. The resulting mixture is poured onto 500 ml. of ice water and the resulting mixture extracted twice each with 200 ml. of methylene chloride. The organic layers are combined, dried over anhydrous sodium sulfate, filtered and evaporated in vacuo to obtain a yellow crystalline residue which is filtered with methylene chloride through a 3 cm. layer of aluminum oxide. The filtrate is concentrated in vacuo to a volume of about 20 ml. and the said concentrate is then treated by addition of diethyl ether (about 100 ml.) to crystallize orange needles of 1-isopropyl-4-phenylquinazoline-2(1H)-thione, m.p. 216°–217° C.

EXAMPLE 2

1-Ethyl-4-phenylquinazoline-2(1H)-thione

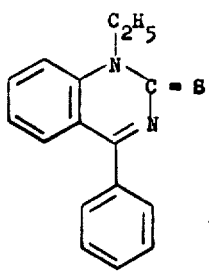

Step A: Preparation of 1-ethyl-4-phenyl-2(1H)-quinazolinone

To a solution of 2.2 g. of 4-phenyl-2(1H)-quinazolinone in 50 ml. of dimethylacetamide is added, at room temperature, 0.75 g. of sodium hydride (50% in mineral oil). The resulting mixture is stirred for 15 minutes at room temperature and then 4 ml. of ethyl iodide is added. The mixture is stirred for an additional 30 minutes at room temperature and then heated at 60° C. for 30 minutes to complete the reaction. The mixture is then evaporated in vacuo to remove most of the solvent, and the residue poured over 100 g. of ice. The resulting solid material is filtered off, dissolved in 50 ml. of methylene chloride and the resulting solution dried over sodium sulfate and the solvent then evaporated in vacuo. The resulting oily residue is crystallized from ethyl acetate to obtain 1-ethyl-4-phenyl-2(1H)-quinazolinone, m.p. 183°–185°C.

Step B: Preparation of 1-ethyl-4-phenylquinazoline-2(1H)-thione

Following the procedure of Step B of Example 1, and employing proportional solvent amounts, unless otherwise indicated, 5 g. of 1-ethyl-4-phenyl-2 (1H)-quinazolinone is reacted with 20 g. of phosphorous pentasulfide in 100 ml. of pyridine to obtain on crystallization from methylene chloride/diethyl ether (1:5) pale orange needles of 1-ethyl-4-phenylquinazoline-2(1H)-thione, m.p. 232°–235° C.

EXAMPLE 3

1-isopropyl-7-methyl-4-phenylquinazoline-2(1H)-thione

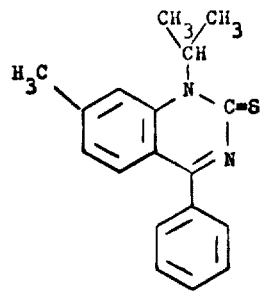

Step A: Preparation of 4-methyl-2-isopropylaminobenzophenone

A mixture of 7 g of 4-methyl-2-aminobenzophenone, 6.35 g of sodium carbonate and 18.8 ml of 2-iodopropane is stirred and refluxed for 3 days. The cooled reaction mixture is then diluted with 200 ml of benzene and washed twice with water and twice with brine. The organic phase is separated, dried over anhydrous sodium sulfate and concentrated in vacuo to remove substantially all of the benzene. The resulting yellow oil is dissolved in about 10 ml of methylene chloride and subjected to column chromatography employing alumina (about 400 g) and methylene chloride as eluant to give a first fraction which on concentration in vacuo to remove methylene chloride produced a yellow oil of 4-methyl-2-isopropylaminobenzophenone.

Step B: Preparation of 1-isopropyl-7-methyl-4-phenyl-2(1H)-quinazolinone

A mixture of 5.9 g of 4-methyl-2-isopropylaminobenzophenone prepared in Step A above, 13.9 g of urethane and 500 milligrams of zinc chloride is heated at a temperature of 190° C. for 1½ hours. There is then additionally added 7 g of urethane and 250 milligrams of zinc chloride, and the heating continued at a temperature of 190° C. for an additional 2½ hours. The resulting mixture is cooled to about 100° C. and diluted with chloroform. The resulting mixture is then filtered and the filtrate washed first with water and then with brine. The organic phase is separated, dried over anhydrous sodium sulfate and concentrated in vacuo to remove substantially all of the chloroform and obtain an oily residue which is dissolved in a small amount of about 20 ml of methylene chloride. The resulting solution is then diluted with about 40 ml of ethyl acetate and concentrated in vacuo to crystallize 1-isopropyl-7-methyl-4-phenyl-2(1H)-quinazolinone; mp 137° to 138° C.

Step C: Preparation of 1-isopropyl-7-methyl-4-phenyl-quinazoline-2(1H)-thione

Following the procedure of Step B of Example 1, and employing proportional solvent volumes, 2 g of 1-isopropyl-7-methyl-4-phenyl-2(1H)-quinazolinone is reacted with 4 g of phosphorus pentasulfide in 20 ml of pyridine (2 1/2 hours reflux) to obtain on crystallization from methylene chloride/diethyl ether (1:5) orange needles of 1-isopropyl-7-methyl-4-phenyl-quinazoline-2(1H)-thione; mp 194° to 198° C.

EXAMPLE 4

1-allyl-4-phenylquinazoline-2(1H)-thione

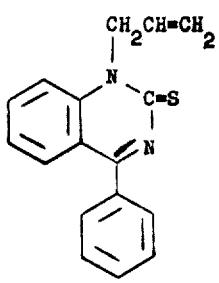

Step A: Preparation of 1-allyl-4-phenyl-2(1H)-quinazoline

Following the procedure of Step A of Example 2, and employing equivalent amounts, 4-phenyl-2(1H)-quinazolinone is reacted with sodium hydride and allyl iodide to obtain on crystallization from ethyl acetate crystals of 1-allyl-4-phenyl-2(1H)-quinazolinone; mp 159° to 160° C.

Step B: Preparation of 1-allyl-4-phenylquinazoline-2(1H)-thione

Following the procedure of Step B of Example 1, and employing equivalent amounts, 1-allyl-4-phenyl-2(1H)-quinazolinone is reacted with phosphorus pentasulfide in 30 ml of pyridine (24 hours reflux) to obtain, after chromatographic purification with silica gel, and crystallization from methylene chloride/diethyl ether (1:5), yellowish crystals of 1-allyl-4-phenyl-quinazoline-2(1H)-thione; mp 186° C.

EXAMPLE 5

3,4-Dihydro-1-isopropyl-4-phenyl-quinazoline-2(1H)-thione

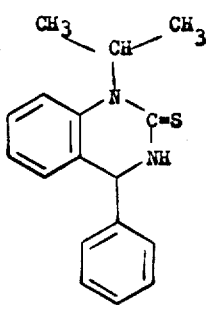

Step A: Preparation of 2-isopropylaminobenzohydrol

To a solution of 24 g. of 2-isopropylaminobenzophenone in 200 ml. of 95% ethanol is added a total of 8 g. of sodium borohydride at temperature of 60° C. over a period of 30 minutes. This mixture is stirred for 3 hours at temperature of 60° C. and acetic acid then is added dropwise until gas evolution ceases. The resulting mixture is then concentrated in vacuo to a volume of about 80 ml. There is then added 300 ml. of water and 20 ml. of 2N sodium hydroxide and the resulting mixture extracted three times each with 100 ml. of methylene chloride. The extracts are combined, dried over anhydrous sodium sulfate and concentrated in vacuo to obtain a crude pale yellow oil of 2-isopropylaminobenzohydrol.

Step B: Preparation of 3,4-dihydro-1-isopropyl-4-phenyl-quinazoline-2(1H)-thione The crude 2-isopropylaminobenzohydrol obtained from Step A, above, is combined with 100 ml. of water, 10 ml. of dioxane and 7.7 ml. of conc. hydrochloric acid and to this mixture is added 7 g. of ammonium isothiocyanate. The resulting mixture is stirred at temperature of 100° C. for 30 minutes to obtain white crystals of 3,4-dihydro-1-isopropyl-4-phenyl-quinazoline-2(1H)-thione, m.p. 185° C.

EXAMPLE 6

3,4-Dihydro-1-methyl-4-phenyl-quinazoline-2(1H)-thione

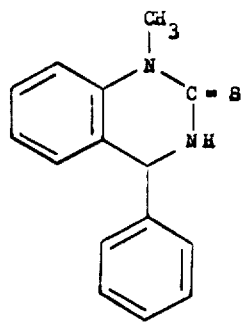

To a solution of 15.6 g. of 2-methylaminobenzohydrol dissolved in 80 ml. of 1N hydrochloric acid is added 6.1 g. of ammonium isothiocyanate. The resulting mixture is refluxed for 15 minutes, then diluted with 100 ml. of water and filtered to obtain a crystalline solid of 3,4-dihydro-1-methyl-4-phenyl-quinazoline-2(1H)-thione; m.p. 188°-190° C.

EXAMPLE 7

6-Chloro-3,4-dihydro-1-methyl-4-phenyl-quinazoline-2(1H)-thione

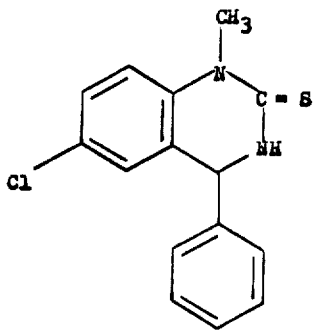

To a solution of 36 g. of 5-chloro-2-methylaminobenzohydrol dissolved in 20 ml. of dioxane and 160 ml. of 1N hydrochloric acid is added 12.4 g. of ammonium isothiocyanate. The resulting mixture is stirred at a temperature of 100° C. for 20 minutes, then made alkaline by addition of 2N sodium hydroxide, and filtered to obtain crystals of 6-chloro-3,4-dihydro-1-methyl-4-phenyl-quinazoline -2(1H)-thione, m.p. 168°-170° C.

EXAMPLE 8

3,4-Dihydro-1-isopropyl-7-methyl-4-phenyl-quinazoline-2(1H)-thione

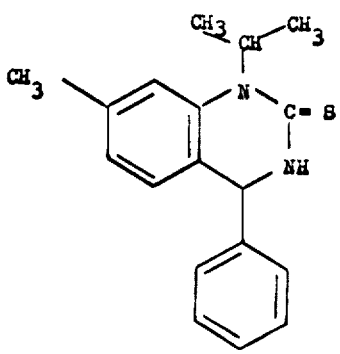

Step A: Preparation of 4-methyl-2-isopropylaminobenzohydrol

To a solution of 7.5 g. of 4-methyl-2-isopropylaminobenzophenone in 50 ml. of 90% ethanol is added a total of 2.5 g. of sodium borohydride in divided portions at about room temperature over a period of about 10 minutes. The resulting mixture is heated at a temperature of 85°–90° C., cooled to about room temperature, treated by dropwise addition of acetic acid to decompose residual sodium borohydride, made acidic by addition of 2N hydrochloric acid and then allowed to stand at room temperature for about ½ hour to decompose the boron complex formed during reaction. The resulting mixture is then made alkaline with 2N sodium hydroxide and extracted three times each with 100 ml. of methylene chloride to obtain after drying and concentration in vacuo a crude light yellow oil of 4-methyl-2-isopropylaminobenzohydrol.

Step B: Preparation of 3,4-dihydro-1-isopropyl-7-methyl-4-phenyl-quinazoline 2(1H)-thione To a solution of 7.5 g. of 4-methyl-2-isopropylaminobenzohydrol obtained from Step A, above, dissolved in 5 ml. of dioxane and 33 ml. of 1N hydrochloric acid is added 2.5 g. of ammonium thiocyanate. The resulting mixture is heated at temperature of 80°–90° C. for 30 minutes resulting in the formation of a heavy brown oil. The reaction mixture is then made slightly alkaline by addition of 2N sodium hydroxide and extracted three times each with 100 ml. of methylene chloride. The organic phases are combined, dried over anhydrous sodium sulfate, filtered and evaporated in vacuo to solid residue which is crystallized from diethyl ether/petroleum ether (1:1) to obtain crystals of 3,4-dihydro-1-isopropyl-7-methyl-4-phenyl-quinazoline-2(1H)-thione, m.p. 125°–127° C.

EXAMPLE 9

3,4-Dihydro-1-isopropyl-7-methoxy-4-phenyl-quinazoline-2(1H)-thione

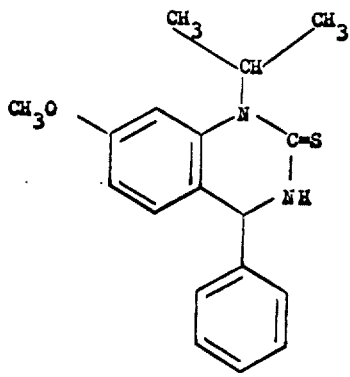

Step A: Preparation of 4-methoxy-2-isopropylaminobenzohydrol

Following the procedure of Step A of Example 8, and employing equivalent amounts, 3.0 g. of 4-methoxy-2-isopropylaminobenzophenone is reacted with sodium borohydride to obtain a crude oil of 4-methoxy-2-isopropylaminobenzohydrol.

Step B: Preparation of 3,4-dihydro-1-isopropyl-7-methoxy-4-phenyl-quinazoline-2(1H)-thione Following the procedure of Step B of Example 8, and employing equivalent amounts, 4-methoxy-2-isopropylaminobenzohydrol obtained from Step A, above, is reacted with ammonium thiocyanate (100° C. for 30 minutes) to obtain on crystallization from diethyl ether white crystals of 3,4-dihydro-1-isopropyl-7-methoxy-4-phenyl-quinazoline-2(1H)-thione, m.p. 138°–140° C.

Example 10

Following the procedure of Example 1 and employing the appropriate corresponding starting materials in approximately equivalent amounts, the following compounds of the invention are prepared:

A. 1-ethyl-6-nitro-4-phenyl-quinazolin-2(1H)-thione, m.p. 256°–257° C. (Crystallization from methylene chloride/diethyl ether).

B. 1-isopropyl-7-methylthio-4-phenyl-quinazolin-2(1H)-thione, m.p. 168°–170° C. (Crystallization from ethanol/pentane).

C. 6-chloro-1-methyl-4-phenyl-quinazolin-2(1H)-thione, m.p. 228°–230° C. (Crystallization from methylene chloride/diethyl ether).

D. 1-isopropyl-6-methoxy-4-phenyl-quinazolin-2(1H)-thione, m.p. 147°–150° C. (Crystallization from acetone/pentane).

EXAMPLE 11

1-Isopropyl-4-phenyl-quinazolin-2(1H)-thione

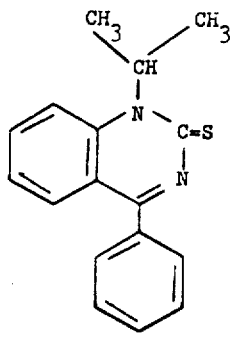

Step A: Preparation of o-isopropylaminobenzophenone

A mixture of 20 g. of o-aminobenzophenone, 10 g. of sodium carbonate and 50 ml. of isopropyl iodide is refluxed with stirring for 5 days. The excess isopropyl iodide is then evaporated off in vacuo, and the resulting residue extracted with 200 ml. of benzene. The benzene extract is then filtered, washed twice with 100 ml. (each) of water, dried over anhydrous sodium sulfate, filtered and evaporated to dryness in vacuo to obtain o-isopropylaminobenzophenone as an oil.

Step B:

To a solution of 11.3 g. of ammonium isothiocyanate in 100 ml. of acetone at room temperature is added dropwise 18.8 g. of benzoylchloride. The resulting suspension is refluxed for 5 minutes, cooled and there is then added 30 g. of o-isopropylaminobenzophenone. The resulting mixture is refluxed for 3 hours, cooled, evaporated in vacuo, suspended in methylene insoluble material filtered off, and the filtrate evaporated followed by crystallization from ethyl acetate/diethyl ether to obtain 1-isopropyl-4-phenyl-quinazolin-2(1H)-thione, m.p. 212°–214° C.

EXAMPLE 12

1-Isopropyl-7-methyl-4-phenyl-quinazolin-2(1H)-thione

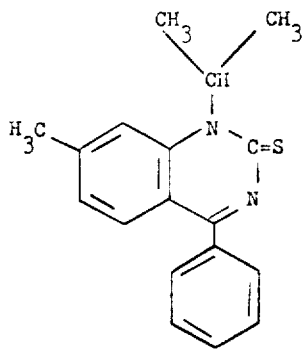

To a solution of 3.5 g. of ammonium isothiocyanate in 100 ml. of actone at room temperature is added dropwise 6.2 g. of benzoylchloride. The resulting suspension is refluxed for 5 minutes, cooled and there is then added 10 g. of 4-methyl-2-isopropylaminobenzophenone. The resulting mixture is refluxed for 3 hours, cooled, evaporated in vacuo, and the residue dissolved in 500 ml. of tetrahydrofuran. To the resulting solution is added 50 ml. of 2N NaOH followed by refluxing on a steam bath for 1 hour. The resulting mixture is evaporated to remove solvent and the mixture extracted with methylene chloride, the organic phase dried and evaporated in vacuo to obtain an oil which recrystallized from ethanol/diethyl ether to obtain 1-isopropyl-7-methyl-4-phenyl-quinazolin-2(1H)-thione, m.p. 185°–190° C.

EXAMPLE 13

1Isopropyl-7-Methyl-4-phenyl-3,4-dihydro-quinazolin-2(1H)-thione

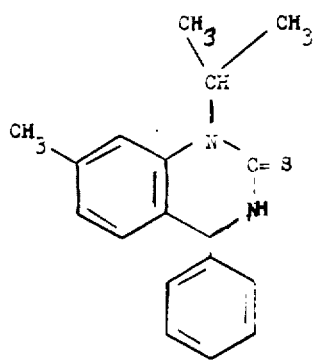

STEP A: Preparation of N-isopropyl-3-methylaniline

To a solution of 3.4 gms. of isopropyl iodide and 2 gms. of triethylamine in 50 mls. n-propanol is added 1 gm. of m-toluidine in one portion. The reaction mixture is then refluxed for 18 hours. The reaction is cooled and any precipitate which separates is removed by filtration. The clear brown filtrate is evaporated at reduced pressure and the resultant oil is triturated with 50 mls. of diethyl ether. Any solid which thus forms is removed by filtration and the filtrate is evaporated at reduced pressure. The treatment with diethyl ether is repeated as long as any solid separates. The oil obtained is subjected to column chromatography and the fraction eluted with 75 mls. of $CH_2Cl_2$ is collected and evaporated at reduced pressure. The resultant n-isopropyl-3-methylaniline has a b.p. of 109° C./51 mm./Hg.

STEP B: Preparation of N-isopropyl-N-(m-tolyl)-N'-benzoylthiourea

To a solution of 10 gms. of ammonium thiocyanate in 100 mls. of acetone is added a solution of 9.5 gms. of benzoyl chloride in 75 mls. of acetone. The mixture is stirred during this addition and for 30 minutes subsequently. Then a solution of 10 gms. of N-isopropyl-3-methylaniline in 75 mls. of acetone is added dropwise, also with stirring. At the end of this addition the reaction mixture is refluxed for 3 hours, cooled, 200 mls. of methylene chloride are added, and the mixture filtered. The filtered cake is washed with a further 100 mls. of methylene chloride and the filtrates combined, evaporated under reduced pressure. The residue is recrystallized from isopropanol to obtain N-isopropyl-N-(m-tolyl)-N'-benzoylthiourea, m.p. 112°–113° C.

STEP C: Preparation of N-isopropyl-n-(m-tolyl)thiourea

To a solution of 45 mls. of dioxane in 200 mls. of water is added 27 gms. of sodium hydroxide and the mixture stirred until dissolution is complete. Then 15 gms. of N-isopropyl-N-(m-tolyl)-N'-benzoylthiourea is added and the resulting reaction mixture refluxed for 4 hours. The resulting mixture is cooled, acidified with concentrated hydrochloric acid, and made slightly basic with concentrated ammonium hydroxide. The resulting basic aqueous solution is filtered free of any solids and the solids are washed with 100 mls. of chloroform. The clear filtrate is extracted three times each with 200 mls. of chloroform and to these filtrates is added the chloroform used to wash the solids. The combined solution is dried, evaporated at reduced pressure, and the residue recrystallized from cyclohexane to obtain N-isopropyl-N-(m-tolyl)thiourea, m.p. 126°–127° C.

STEP D: Preparation of 1-Isopropyl-7-methyl-4-phenyl-3,4-dihydro-quinazolin-2(1H)-thione To 25 mls. of a saturated solution of anhydrous hydrogen chloride gas in anhydrous benzene is added 1 gm. of N-isopropyl-N-(m-tolyl)thiourea. The resulting mixture is stirred and a solution of 2 gms. of benzaldehyde in 10 mls. of anhydrous benzene is added dropwise. The reaction mixture is then refluxed for 15 hours, cooled, and evaporated at reduced pressure to obtain a semi-solid which is triturated with 50 mls. of diethyl ether. The thus-formed solid is removed by filtration and the filtrate washed several times with 10% aqueous solution of sodium bisulphite. The ethereal solution is then evaporated at reduced pressure to obtain 1-isopropyl-7-methyl-4-phenyl-3,4-dihydro-quinazolin-2(1H)-thione as an amorphous powder which can be crystallized from diethyl ether/petroleum ether to again obtain the 1-isopropyl-7-methyl-4-phenyl-3,4-dihydro-quinazolin-2(1H)-thione, m.p. 125°–127° C.

What is claimed is:

1. The method of treating inflammation in animals comprising administering to an animal an inflammation treating effective amount of a compound of the formula:

[Structure diagram: benzene ring fused with N(R')−C(=S)−x−y, with (R)n on benzene]

wherein $\widehat{x\,y}$ is either $\begin{array}{c}\diagdown\\ C=\!=\!\!N\diagup\\ |\\ R''\end{array}$ or $\begin{array}{c}\diagdown\phantom{x}H\\ C\!-\!\!-\!\!N\diagup\\ |\phantom{xx}H\\ R''\end{array}$ , R is, independently, hydrogen; halo having an atomic weight no greater than 80; lower alkyl; lower alkoxy; nitro; cyano; lower alkylthio; trifluoromethyl; or di(lower)alkylamino;

n is 1 or 2, and when 2 then one and the other R is, independently, halo, lower alkyl or lower alkoxy, or the other R is di(lower)alkylamino;

R' is lower alkyl; allyl; methallyl; or propargyl;

R'' is phenyl; or substituted phenyl of the formula:

[phenyl ring with Y and Y' substituents]

Y represents halo (as defined above); lower alkyl; lower alkoxy; or trifluoromethyl; and Y' represents hydrogen; halo (as defined above); lower alkyl; or lower alkoxy.

2. The method of claim 1 in which the compound is a compound of the formula:

[quinazoline-2(1H)-thione structure with R', (R)n, R'']

wherein R, R', R'' and n are as defined in claim 1.

3. The method of claim 2 in which the compound is a compound in which R' is isopropyl.

4. The method of claim 3 in which the compound is a compound in which R is selected from the group consisting of hydrogen, halo, lower alkyl and lower alkoxy.

5. The method of claim 4 in which the compound is a compound in which R'' is phenyl.

6. The method of claim 5 in which the compound is a compound in which n is 1.

7. The method of claim 6 in which the compound is 1-isopropyl-4-phenylquinazoline-2(1H)-thione.

8. The method of claim 6 in which the compound is 1-isopropyl-7-methyl-4-phenylquinazoline-2(1H)-thione.

9. The method of claim 2 in which the compound is 1-ethyl-4-phenylquinazoline-2(1H)-thione.

10. The method of claim 2 in which the compound is administered in an amount of from 20 to 1000 milligrams per day.

11. A pharmaceutical composition comprising an inert pharmaceutically acceptable carrier and an antiinflammatory treating effective amount of a compound of the formula:

[structure as above]

wherein $\widehat{x\,y}$ is either $\begin{array}{c}\diagdown\\ C=\!=\!\!N\diagup\\ |\\ R''\end{array}$ or $\begin{array}{c}\diagdown\phantom{x}H\\ C\!-\!\!-\!\!N\diagup\\ |\phantom{xx}H\\ R''\end{array}$ R is, independently, hydrogen; halo having an atomic weight no greater than 80; lower alkyl; lower alkoxy; nitro; cyano; lower alkylthio; trifluoromethyl; or di(lower)alkylamino;

n is 1 or 2, and when 2 then one and the other R is, independently, halo, lower alkyl or lower alkoxy, or the other R is di(lower)alkylamino;

R' is lower alkyl; allyl; methallyl; or propargyl;

R'' is phenyl; or substituted phenyl of the formula:

[phenyl ring with Y and Y' substituents]

Y represents halo (as defined above); lower alkyl; lower alkoxy; or trifluoromethyl; and Y'' represents hydrogen, halo (as defined above); lower alkyl; or lower alkoxy.

12. A composition in accordance with claim 11 in which the compound is a compound of the formula:

[quinazoline-2(1H)-thione structure]

wherein R, R', R'' and n are defined in claim 11.

13. A composition in accordance with claim 12 in which the compound is a compound in which R' is isopropyl.

14. A composition in accordance with claim 13 in which the compound is a compound in which R is selected from the group consisting of hydrogen, halo, lower alkyl and lower alkoxy.

15. A composition in accordance with claim 14 in which the compound is a compound in which R'' is phenyl.

16. A composition in accordance with claim 15 in which the compound is 1-isopropyl-4-phenylquinazoline-2(1H)-thione.

17. A composition in accordance with claim 15 in which the compound is 1-isopropyl-7-methyl-4-phenylquinazoline-2(1H)-thione.

18. A composition in accordance with claim 12 in which the compound is 1-ethyl-4-phenylquinazoline-2(1H)-thione.

19. A composition in accordance with claim 12 in unit dosage form and containing 3 to 500 milligrams of the compound.

* * * * *